United States Patent Office 3,634,286
Patented Jan. 11, 1972

3,634,286
STABLE, HOMOGENEOUS SUSPENSION OF SILICA-PHOSPHATE COMPOSITION AND METHOD OF PREPARATION
Paul Clifford Yates, Wilmington, Del., assignor to E. I. du Pont de Nemours and Company, Wilmington, Del.
No Drawing. Filed July 9, 1969, Ser. No. 840,528
Int. Cl. B01j 13/00
U.S. Cl. 252—313 S                    7 Claims

ABSTRACT OF THE DISCLOSURE

Water suspensions containing (i) a silicate or mixture of a silicate and colloidal silica and (ii) a phosphate of cerium, hafnium, tin, titanium, or zirconium have been found to be stable. Water-insoluble films or ion-exchange members can be made by removing the water from the suspensions.

BACKGROUND OF THE INVENTION

Alkaline ionic silicates are well known in the art as binders, and inorganic phosphates are becoming well known as ion exchange materials. I have discovered that the ion exchange phosphates are compatible with the alkaline ionic silicates without causing gel formation such as is encountered in employing organic ion-exchange materials, and yet when dried, the compositions show a high degree of water insolubility and excellent refractory properties. These ion exchange phosphates are very effective insolubilizing agents for silicate films and give insoluble, stronger films at lower levels of additive than prior art insolubilizing agents for silicate films. This, in conjunction with the compatibility while in aqueous solution, is surprising, because previous additives for insolubilizing silicate films such as by acidification or the addition of zinc oxide, have given compositions with only a limited pot life or stability.

SUMMARY OF THE INVENTION

The present invention is directed to a stable, homogeneous suspension consisting essentially of from 10 to 97 parts by weight of water and suspended therein from 90 to 3 parts by weight of a solid, the solid consisting of:

(1) 5 to 97 parts by weight calculated as $SiO_2$, of a material selected from the group consisting of:

(A) an alkaline ionic silicate selected from the group consisting of (i) alkali metal silicates, (ii) guanidine silicate, (iii) quaternary ammonium silicates, and (iv) mixtures thereof, and (B) mixtures of (A) with up to 80% by weight of colloidal amorphous silica; and (2) 95 to 3 parts by weight of a colloidal metal phosphate selected from the group consisting of cerium phosphate, hafnium phosphate, tin phosphate, titanium phosphate, and zirconium phosphate.

The invention is further directed to water-insoluble compositions having excellent refractory properties prepared by removing the water from the suspensions.

The suspensions can be made by intimately mixing in water:

(1) 5 to 97 parts by weight calculated as $SiO_2$, of a material selected from the group consisting of:

(A) an alkaline ionic silicate selected from the group consisting of (i) alkali metal silicates, (ii) guanidine silicate, (iii) quaternary ammonium silicates, and (iv) mixtures thereof, and (B) mixtures of (A) with up to 80% by weight of colloidal amorphous silica; and (2) 95 to 3 parts by weight of a colloidal metal phosphate selected from the group consisting of cerium phosphate, hafnium phosphate, tin phosphate, titanium phosphate and zirconium phosphate.

The water-insoluble compositions in view of the fact they are hard, strong, abrasion resistant and can be heated to high temperatures, are useful as ion-exchange materials and refractory binding materials.

DETAILED DESCRIPTION OF THE INVENTION

Source of silicates

Alkaline ionic silicates useful for preparing the compositions of this invention are (i) the alkali metal silicates, such as lithium silicate, potassium silicate, and sodium silicate, (ii) guanidine silicate, (iii) quaternary ammonium silicates, such as tetramethylammonium silicate, tetraethanolammonium silicate, and tetraethylammonium silicate, and (iv) mixtures thereof.

The alkali metal silicates are commercially available, and are generally sold as aqueous solutions having an $SiO_2$ to $M_2O$ mole ratio of from 1:1 to about 4:1, where M stands for an alkali metal such as sodium, potassium, or lithium. Amorphous water-soluble guanidine silicates can be prepared as disclosed in my U.S. application Ser. No. 715,556, filed Mar. 25, 1968, and now U.S. Pat. No. 3,475,375.

Solutions of the silicates of the quaternary ammonium bases may be prepared either by dissolving high surface area colloidal amorphous silica in concentrated solutions of the quaternary ammonium base or by deionizing an aqueous solution of an alkali metal silicate with an excess of a cation exchange resin in which the exchangeable cations are those of the strong quaternary ammonium base, such as tetraethanolammonium cations or tetramethylammonium cations. Suitable ion-exchange resins for this purpose are strong acid ion exchange resins prepared by sulfonation of a polystyrene matrix which has been cross-linked with small amounts of divinylbenzene. Such resins are commercially available and have ion-exchange capacities of approximately 5 milliequivalents of exchangeable cations per gram of dry resin. An example of such an ion-exchange resin is "Rexyn" 101 which is sold by the Fisher Scientific Co. This resin is commercially available in the hydrogen form and the necessary quaternary ammonium form may be prepared by contacting the hydrogen form of the resin with a large excess of the corresponding quaternary ammonium hydroxide.

The commercially available alkali metal silicates are preferred for use in the invention because of their low cost and ready commercial availability. These materials generally have silica concentrations of from 20 to 35% silica.

Mixtures of the alkaline ionic silicates with colloidal amorphous silica sols are useful for making the compositions of the invention. The colloidal amorphous silica sols may be substituted in amounts up to 80%, by weight, of the total silica in the composition. Substitution of higher quantities of amorphous silica is generally undesirable because of deterioration of the film-forming and binding characteristics of the composition. Because of compatibility, the preferred silicates for use with the colloidal amorphous silica sols are the silicates of lithium, potassium, guanidine and tetraethanolammonium. However, sodium silicate may be employed if the mole ratio of silica to sodium oxide is sufficiently high, such as a mole ratio of 4 or slightly higher to 1.

The colloidal amorphous silica sols will generally have particle sizes ranging from about 5 millimicrons to 250 millimicrons, and concentrations of from 10% to 40% $SiO_2$. These materials are commercially available from a variety of sources, including E. I. du Pont de Nemours & Co., under the trade name of "Ludox" Colloidal Silicas; the National Aluminate Co. of America, under the trade name of "Nalcoag"; and Monsanto Chemical Co. under the trademark "Syton."

Source of metal phosphates

The metal phosphates useful for preparing the compositions of this invention are cerium phosphate, hafnium phosphate, tin phosphate, titanium phosphate, and zirconium phosphate.

It is preferred that these phosphates be employed in the form of colloidal particles, having at least two of their dimensions in the colloidal size range, which for the purposes of this invention can be defined as less than 100 millimicrons. Such phosphates may be prepared either as crystalline materials or as amorphous materials by a reaction between phosphoric acid and aqueous solutions of the corresponding metal ions. The ratio of phosphate to transition metal atoms in these materials will generally be from 1:1 to 2:1.

The preparation of the phosphates is discussed inter alia in Amphlett, Inorganic Ion Exchangers, Elsevier Press, Amsterdam (1964). The preparation of fibrous cerium phosphate is disclosed in Alberti et al., "Journal of Inorganic and Nuclear Chemistry," vol. 30, pages 295–404 (1968). The preparation of amorphous cerium phosphate is discussed in a Ph.D. thesis by D. Vissers, University of Wisconsin, Madison, 1959, and in a thesis by W. A. Cilley, University of Wisconsin, Madison, 1963. The preparation of amorphous cerium phosphate is also discussed in an article by Rocco, et al., Physical Sciences Research Paper No. 73, AFCRL–60–1018, (December 1964). Microcrystalline, nonfibrous cerium phosphate materials can be prepared according to procedures given by Koenig et al., "Journal of Inorganic and Nuclear Chemistry," vol. 29, page 1153 (1967). The preparation of crystalline titanium phosphate is disclosed in Alberti et al., "Journal of Inorganic and Nuclear Chemistry," vol. 29, page 571 (1967) and Alberti et al., "Journal of Chromatography," vol. 28, page 118 (1967).

CHARACTERIZATION AND ANALYSIS OF THE COMPOSITIONS OF THE INVENTION

The concentration of solid contained in the compositions of the invention can be determined by evaporation to dryness and heating for an hour at 130° C. The parts by weight of solid consisting of $SiO_2$ can be determined by conventional analytical methods for determining silica gravimetrically such as by acidification to precipitate the silica followed by fuming with $H_2SO_4$ and HF (following appropriate conventional procedures to eliminate interference from the colloidal metal phosphate constituent). Alternatively, silica can be determined by colorimetric procedures such as the molybdic acid colorimetric method.

The alkali metal associated with the alkaline ionic silicate can be determined by atomic adsorption or flame ionization techniques. The metal content of the colloidal metal phosphates can be determined by appropriate conventional analytical procedures such as atomic adsorption, or gravimetric or colorimetric methods as can be the phosphate content of the compositions of the invention.

PROCESS CONDITIONS

The ratio of silica to metal phosphate will depend upon the particular end use of the product. Generally, the compositions will contain from 5 to 97 parts by weight originating from the alkaline ionic silicate or its mixture with colloidal silica, of $SiO_2$ and from 95 to 3 parts by weight of the metal phosphate.

As little as 3 parts by weight of the metal phosphate is sufficient to substantially enhance the water insolubility of the alkaline ionic silicates and in the case of fibrous metal phosphates, such as cerium phosphate, this low percentage will also modify the rheological properties. For example, 3 parts by weight of fibrous cerium phosphate can be added to sodium silicate solutions and the viscosity then becomes almost ideal for spinning operations where the silicate can be converted into continuous filaments.

When the compositions of the invention are to be employed as catalysts where a certain amount of porosity is desirable, relatively small amounts of the alkaline ionic silicates should be employed. Strongly bonded masses can be prepared, for example, with as little as 5 parts by weight calculated as $SiO_2$ of the total dried composition consisting of the alkali ionic silicates. For the preparation of ion-exchange membranes, more silicate is desirable in order to improve the mechanical strength and these compositions will contain from 10 parts to about 70 parts by weight calculated as $SiO_2$ of the alkaline ionic silicate or its mixtures with colloidal amorphous silica.

The stable, homogeneous suspensions of this invention are made by intimately mixing an aqueous solution of the silicate with either (1) an aqueous dispersion of the colloidal metal phosphate or (2) the dry form of the metal phosphate until a homogeneous suspension is obtained. The suspension can then be dried at room temperature, or at temperatures up to 100° C., to eliminate the water, at which point the remaining composition becomes water-insoluble. Thereafter the compositions can be contacted with aqueous acids such as nitric acid or hydrochloric acid to neutralize the alkaline ion content of the silicate, and to convert the metal phosphate into its hydrogen form. After treatment with acid, the composition can be dried to give a hydrogen ion-exchange membrane. Alternatively, the composition can be contacted with concentrated solutions of other cations, such as a concentrated solution of an ammonium salt, to prepare other forms of the ion-exchange membranes, such as the ammonium form.

Shaped articles can be prepared by casting and drying as noted above, in suitably shaped molds, or particularly for those compositions containing higher proportions of the metal phosphate, fabrication can be by extrusion, injection molding, slip casting, and other procedures conventionally used in the art to prepare ceramic shapes. The compositions can be dried and heated as noted above, and thereafter, if desired, contacted with an acid to convert them to the hydrogen ion-exchange forms. It should be noted that it is also possible to set the compositions of this invention by exposure to carbon dioxide gas, which is a rapid production technique for converting the fluid compositions into dense, rigid shapes. In order to ensure satisfactory penetration of the carbon dioxide gas and rapid setting throughout the mixture, it is best to use compositions which are somewhat porous and which contain a high proportion of the ion-exchange phosphate relative to the silicate.

EXAMPLES

The following examples are illustrative of the compositions which can be prepared in accordance with the processes of this invention. Parts are by weight unless otherwise noted.

EXAMPLE 1

Zirconyl nitrate in concentrated nitric acid is prepared by dissolving 250 grams of zirconyl nitrate in 2260 grams of nitric acid and allowing the product to settle overnight. Chemical analysis show it to contain 5.55% $ZrO_2$. One hundred sixty-seven grams of this zirconyl nitrate solution is whizzed at top speed in a laboratory Waring Blendor while a thin stream of 100 grams of a colloidal silica containing 20 millimicron spherical amorphous silica particles and 40%, by weight, of $SiO_2$, are delivered directly into the vortex of the blender. A stable colloidal suspension is obtained. Four and one-half grams of 85% phosphoric acid are diluted to 10 ml. with water and pipetted as a thin stream into the zirconyl nitrate colloidal silica mixture. About one-third of the resulting stable sol is neutralized with 25% caustic to a pH of 9. Although the product is turbid and viscous, it is still stable and not gelled even though the salt concentration is high. A silica sol not protected by a zirconium phosphate coating would gel rapidly under these conditions. The remaining zirconium phosphate-coated colloidal silica sol is mixed with about one-third of its volume of concentrated sodium silicate containing 28% $SiO_2$ and 8.7% sodium oxide. The resulting mixture is still completely stable, even though in the absence of the zirconium phosphate the other constituents would not be stable with one another in these proportions.

EXAMPLE 2

Fifty-five and four-tenths grams of 85% phosphoric acid are mixed with 3 moles (270 grams) of concentrated nitric acid and diluted to a liter with water. While this is being whizzed at top speed in a homomixer, 1000 grams of a zirconyl nitrate solution containing 5.93 grams of zirconia per 100 grams of solution is delivered in a thin stream into the vortex of the stirred nitric acid-phosphoric acid solution. A white colloidal precipitate is formed. The precipitate is recovered by spinning through a Sharples Supercentrifuge and is resuspended in water. It is centrifuged to get rid of excess nitric acid and suspended in about 800 ml. of water. At this point the pH is 1.1. The product is deionized to a pH of 2.0 using the hydroxyl form of a strong base ion-exchange resin prepared by chloromethylation of a styrene-divinyl benzene copolymer resin and reacting the chloromethylated polymer with trimethyl amine to form quaternary ammonium ion-exchange groups on the polymer matrix. The preparation of such resins is discussed on pages 88 through 97 of a book by Robert Kunin entitled "Ion Exchange Resins," John Wiley & Sons, New York, N.Y., 2nd edition, 1958. The total weight of this stage is 729 grams and the percent solids is 5.01. Chemical analysis shows it to be a zirconium phosphate having a 1:1 mole ratio of zirconium to phosphorous. Nitrogen surface area determination shows the product to have a surface area of 300 m.$^2$/gram. The loss on ignition shows it to contain about 39.2% water. A mixture of 20 grams of sodium silicate containing 28% $SiO_2$, 8.7% sodium oxide, and having a molar ratio of $SiO_2$ to sodium oxide of 3.22, is mixed with 25 grams of the zirconyl phosphate colloidal suspension in water. Upon drying, a continuous film is formed. This film is quite water-resistant after drying at 90° C. on a steam bath and cannot be removed even upon rubbing 25 times with steel wool under water. The excellent water resistance of this film is in contrast to one which does not contain the zirconium phosphate, which is completely removed by rubbing with steel wool 25 times under water. It should be noted that only about 11% of the available sodium ions of the sodium silicate are removed by ion-exchange with the zirconium phosphate. Thus it seems that the zirconium phosphate is exceptionally good material for improving the water resistance of sodium silicate films, even at quite low concentrations.

EXAMPLE 3

Ninety-one and four-tenths grams of titanium tetrachloride are added dropwise in a 2 liter stirred flask in an ice bath to a solution of 530 grams of concentrated (70-71%) nitric acid and 379 grams of water. The temperature is maintained between 18° C. and 25° C. during addition. Following addition, the solution is clear, but colored with some chlorine gas. The solution is added with rapid stirring to a solution of 56.7 grams of 85% phosphoric acid and 270 grams of 70-71% nitric acid, which is diluted to a liter volume with distilled water. Following a short induction period, a white, gelatinous colloid is formed. This colloid is allowed to stand overnight.

The colloid is then centrifuged, reslurried, and washed until the pH is 0.5. It is then deionized with the hydroxyl form of an anion exchange resin like that used in Example 2 to a pH of 2. The sample is dried overnight on a steam bath and fired an hour at 800° C., and shows the percent solids to be 3%. Chemical analyses show the product to be titanium phosphate containing titanium and phosphate in approximately a 1:1 ratio. The surface area of the product is 198 m.$^2$/gram. The material is added to sodium silicate solution containing 30% $SiO_2$, 8.7% sodium oxide, and an $SiO_2$ to $Na_2O$ mole ratio of 3.22:1, in proportions such that the parts by weight of titanium phosphate on a solids basis to parts by weight of $SiO_2$ are 5, 10, 25 and 50 respectively. All the resulting compositions are stable in extended storage and form water-insoluble hard films when dried. After drying, these films are treated with an excess of dilute 10% nitric acid and washed. The ion-exchange capacity of the films is measured and it is found to be approximately proportional to the concentration of titanium phosphate present in the film and proportional to the pH at which the ion-exchange is conducted.

EXAMPLE 4

Eighty-three grams of anhydrous ceric sulfate is dissolved in 5 liters of 0.5 molar sulfuric acid. This solution is added very slowly, dropwise, to 5 liters of 6 molar phosphoric acid maintained at a temperature of 94° C. Addition is performed at the rate of 5 ml. to 10 ml. per minute over a 2 day period, with additions ceasing overnight. Total addition time is 11 hours. The mixture is then stirred for 4 more hours at 94° C. and is filtered and washed four times with 1200 ml. to 1400 ml. portions of distilled water. Electron micrographs show the resulting product to consist of approximately 25 millimicron diameter, long, flexible fibers having a nitrogen surface area of 25 m.$^2$/gram, and a formula as shown by chemical analysis, of $Ce(HPO_4)_2 \cdot H_2O$. The washed fibrous cerium phosphate is mixed with sodium silicate containing 30% $SiO_2$, 8.7% sodium oxide, and having a molar ratio of $SiO_2$ to sodium oxide of 3.22:1, in quantities to give a 3% by weight cerium phosphate fiber to the sodium silicate. The resulting solution can be spun into long monofilaments which can be treated after drying at 100° C. with an aqueous dilute acid solution, such as acetic acid, to give ion-exchange fibers.

Two hundred grams of the cerium phosphate fibers are dispersed as a 5% by weight solution in distilled water. Sodium silicate in an amount of 10%, based on the weight of the fibers, is added to the solution. The fibers are then filtered to form a matt and dried. It is found that the resulting porous matt is strong and rigid and has a very high ion-exchange capacity. It is also essentially completely water-soluble.

USES FOR COMPOSITIONS OF THE INVENTION

The compositions of this invention can be used as binders and adhesives and further as precursors to make insoluble films, such as adhesive films or coatings in the fashion in which alkaline ionic silicates are generally used. For such purposes, the water insolubility of the present compositions are much better than those of unmodified sodium silicate or other alkaline silicate films.

While relatively small amounts of the colloidal metal phosphates are sufficient for applications such as water insolubilization, compositions containing larger quantities such as those in the preferred range containing from 30 to 90 parts by weight of the phosphates show excellent ion-exchange characteristics in a variety of purposes, such as in battery separators, in desalinization of water either by electrodialysis or reverse osmosis, as well as in other applications where electrically conductive ion-exchange membranes are suitable.

Finally, the compositions of the invention are useful as catalysts, particularly in their hydrogen form, where they show catalytic cracking activity similar to that of aluminosilicate cracking catalysts.

What is claimed is:

1. A stable, homogeneous suspension capable of being dried to a water-resistant film, said suspension consisting essentially of from 10 to 97 parts by weight of water having suspended therein from 90 to 3 parts by weight of a solid, said solid consisting essentially of
   (1) 5 to 97 parts by weight calculated as $SiO_2$, of a material selected from the group consisting of:
      (a) an alkaline ionic silicate selected from the group consisting of (i) alkali metal silicates, (ii) guanidine silicate, (iii) quaternary ammonium silicates, and (iv) mixtures thereof, and
      (b) mixtures of (a) with up to 80% by weight of colloidal amorphous silica; and
   (2) 95 to 3 parts by weight of a colloidal metal phosphate selected from the group consisting of cerium phosphate, hafnium phosphate, tin phosphate, titanium phosphate, and zirconium phosphate.

2. The suspension of claim 1 wherein the material is an alkali metal silicate.

3. The suspension of claim 1 wherein the material is a mixture of (a) a silicate selected from the group consisting of lithium silicate, potassium silicate, guanidine silicate, and tetraethanolammonium silicate and (b) colloidal amorphous silica.

4. The suspension of claim 1 wherein the phosphate is zirconium phosphate.

5. The suspension of claim 1 wherein the phosphate is titanium phosphate.

6. The suspension of claim 1 wherein the phospate is cerium phosphate.

7. A method for preparing the stable, homogeneous suspension of claim 1 comprising intimately mixing an aqueous solution of a material selected from the group consisting of (a) an alkaline ionic silicate selected from the group consisting of (i) alkali metal silicates, (ii) guanidine silicate, (iii) quaternary ammonium silicates, and (iv) mixtures thereof, and (b) mixtures of (a) with up to 80% by weight of colloidal amorphous silica, with either the dry form of a colloidal metal phosphate selected from the group consisting of cerium phosphate, hafnium phosphate, tin phosphate, titanium phosphate and zirconium phosphate, or an aqueous dispersion of said colloidal metal phosphate.

References Cited
UNITED STATES PATENTS

| | | | |
|---|---|---|---|
| 2,811,416 | 10/1957 | Russell et al. | 252—437 X |
| 2,938,874 | 5/1960 | Rosinski | 252—317 X |
| 2,995,453 | 8/1961 | Noble et al. | 106—286 X |
| 3,248,250 | 4/1966 | Collins, Jr. | 106—286 |
| 3,271,299 | 9/1966 | Kearby | 252—317 X |

RICHARD D. LOVERING, Primary Examiner

U.S. Cl. X.R.

106—55, 57, 65 69, 84, 286; 252—179, 313 R, 314, 317, 437, 518, 520, 521